(12) United States Patent
Kollman

(10) Patent No.: US 8,839,703 B2
(45) Date of Patent: Sep. 23, 2014

(54) WINDOW COVERING CUTTING DEVICE

(75) Inventor: Michael Kollman, Fitchburg, WI (US)

(73) Assignee: Lumino, Inc., Madison, WI (US)

( * ) Notice: Subject to any disclaimer, the term of this patent is extended or adjusted under 35 U.S.C. 154(b) by 1382 days.

(21) Appl. No.: 11/879,986

(22) Filed: Jul. 19, 2007

(65) Prior Publication Data

US 2009/0019978 A1 Jan. 22, 2009

(51) Int. Cl.
| | | |
|---|---|---|
| *B26D 7/06* | (2006.01) | |
| *B26D 3/00* | (2006.01) | |
| *B23D 23/00* | (2006.01) | |
| B23D 33/02 | (2006.01) | |
| E06B 9/266 | (2006.01) | |

(52) U.S. Cl.
CPC ............. *B23D 23/00* (2013.01); *B32D 33/006* (2013.01); *B23D 33/025* (2013.01); *E06B 9/266* (2013.01)
USPC ........ 83/651; 83/468; 83/52; 83/200; 83/196; 83/198

(58) Field of Classification Search
USPC ............... 83/468.2, 651, 684, 197, 588, 628, 83/639.5, 452, 517, 196, 198, 425, 697, 83/553, 397, 471, 52, 200; 29/24.5
See application file for complete search history.

(56) References Cited

U.S. PATENT DOCUMENTS

| | | | | |
|---|---|---|---|---|
| 2,925,005 | A | * | 2/1960 | Hensley ........................... 83/176 |
| 3,762,258 | A | * | 10/1973 | Bender ............................ 83/383 |
| 3,853,028 | A | * | 12/1974 | Jagers ............................. 83/461 |
| 4,241,630 | A | * | 12/1980 | Moriya ........................... 83/409 |
| 4,658,433 | A | * | 4/1987 | Savicki ........................... 383/63 |
| 4,669,348 | A | * | 6/1987 | Holder ......................... 83/466.1 |
| 5,114,394 | A | * | 5/1992 | Madsen ......................... 493/227 |
| 5,799,557 | A | | 9/1998 | Wang |
| 5,927,172 | A | | 7/1999 | Wang |
| 6,079,306 | A | * | 6/2000 | Liu ................................. 83/454 |
| 6,089,134 | A | | 7/2000 | Marocco |
| 6,098,694 | A | * | 8/2000 | Ohanesian ............. 160/168.1 V |
| 6,196,099 | B1 | | 3/2001 | Marocco |
| 6,427,571 | B1 | * | 8/2002 | Hsu ................................ 83/454 |
| 6,758,120 | B2 | | 7/2004 | Marocco |
| 7,104,175 | B2 | | 9/2006 | Roberts et al. |
| 7,114,421 | B2 | | 10/2006 | Marocco |
| 2004/0065182 | A1 | | 4/2004 | Lin |
| 2004/0069104 | A1 | | 4/2004 | Caputo |
| 2004/0149104 | A1 | * | 8/2004 | Jabbari et al. .................. 83/454 |

* cited by examiner

*Primary Examiner* — Ghassem Alie

(74) *Attorney, Agent, or Firm* — Buchanan Ingersoll & Rooney PC

(57) ABSTRACT

A window covering cutting device is disclosed that has a support table, a slot, and a blade. The support table has a support surface on which at least a portion of a window covering can be placed. The clamp has a slot and is positioned near the support surface so there is a plane that passes through the slot. The clamp is moveable from a first open position to at least one clamping position. The blade is positioned for movement from a first position to a second position so that a portion of the blade will be within the slot of the clamp when the blade is in the second position and the clamp is in one of its clamping positions.

18 Claims, 5 Drawing Sheets

WINDOW COVERING CUTTING DEVICE

FIELD OF INVENTION

The present invention relates to window covering cutting machines.

BACKGROUND OF THE INVENTION

Home centers and other retailers often provide cutting machines configured to cut stock window coverings they offer for sale. The cutting machines permit the retailer to cut the stock window covering for a customer so the window covering can be mounted in a window opening that has dimensions that are smaller than the available stock sizes of the window covering. Examples of such cutting machines are disclosed in U.S. Patent Publication No. 2007/0000363 and U.S. Pat. Nos. 5,799,557, 5,927,172 and 6,761,099.

Many cutting machines include a cutting mechanism attached to a table. The cutting mechanism normally includes at least one blade that moves along a horizontal or vertical axis. The blade is configured to cut portions of the window covering. Often, a housing is provided that has openings sized to receive portions of a window covering. A user cuts a window covering down to a desired size by inserting a portion of the window covering or window covering work piece through the one or more openings and then actuating the blade to cut that portion.

When window covering material is being cut, a clamp is usually provided to compress the window covering material to be cut so the blade can easily cut through the material. As the blade wears, the blade may not cut through all of the window covering material, which may require additional cutting passes with the blade or replacement of the blade. For example, worn blades often fail to cut through all the slats of a vertical blind being cut down by a retailer in one cutting pass. Should that occur, the blade may be replaced in order to cut all the slats. Alternatively, the blades or clamp portion could be adjusted to cut the remaining slats. This is possible because although the blade was worn a little, the blade is still capable of making a clean through cut. Frequently, the store sales associate will simply call a service technician to replace the blade and not use the machine until the blade has been replaced.

Whenever one or more slats in a stack to be cut are not cut because a blade is worn, the sales associate may put additional slats or a spacer on top of those to be cut and repeat the cutting process. Such problems increase the retailer's costs, the amount of time needed to effectively cut down a window covering for a customer, and the perceived quality and proficiency of customer service provided by the retailer.

A window covering cutting machine is needed that can continue to completely cut through window covering material on one cutting pass after the blade is worn some, but still capable of making the cut. Preferably, the cutting machine is also configured to reduce the wear or damage the blades of the machine may experience if they deflect after cutting a portion of the window covering.

SUMMARY OF THE INVENTION

I provide a window covering cutting device that includes a support table, a clamp, and a blade. The support table has a support surface on which at least a portion of a window covering to be cut is placed. The support table also has an edge that is normal to the support surface. The clamp has a slot and is moveable from a first open position to at least one clamping position. The clamp is positioned near the support surface so that there is a plane passing through the slot of the clamp. The plane is adjacent the edge of the support table. The blade is positioned for movement within the plane from a first position to a second position so that a portion of the blade is within the slot of the clamp when the blade is in the second position and the clamp is in one of its clamping positions. Preferably, the blade is configured to move along a vertical or horizontal axis. The clamp may be configured in two adjacent pieces with the slot cut in either or both pieces.

The window covering cutting device can also include a housing connected to the support table. The housing has a first opening sized to receive a portion of the window covering to be cut. The first opening can be sized to receive window covering material, such as slats from vertical blinds, mini blinds, or venetian blinds. The housing can also have a second opening that is sized and configured to receive a headrail of a window covering and a third opening sized and configured to receive a bottomrail of a window covering. The clamp typically would have one portion on each side of the housing. Each portion may move independently from the other portion.

One or more resilient inserts may be positioned within the slot of the clamp. The resilient insert or inserts can be composed of plastic or rubber. The clamp may also be composed of plastic or rubber.

A moveable end stop can also be provided opposite the support surface of the support table. The end stop may be moved to abut the end of a portion of a window covering work that is to be cut by the blade.

The table can also include an aperture formed in the table. The edge of the table may define a portion of the aperture.

In some embodiments, a second clamp may be provided adjacent the plane and opposite the clamp with the slot. The second clamp can be configured to move toward and away from the other clamp. Of course, the second clamp may also have a slot. Preferably, the slot of the second clamp is configured to be aligned with the slot of the other clamp when the two clamps are moved to their respective clamping positions.

Other details, objects, and advantages of the invention will become apparent as the following description of certain present preferred embodiments thereof proceeds.

BRIEF DESCRIPTION OF THE DRAWINGS

In the accompanying drawings I have shown certain present preferred embodiments of my window covering cutting device in which.

DETAILED DESCRIPTION OF PRESENT PREFERRED EMBODIMENTS

Figure 1:
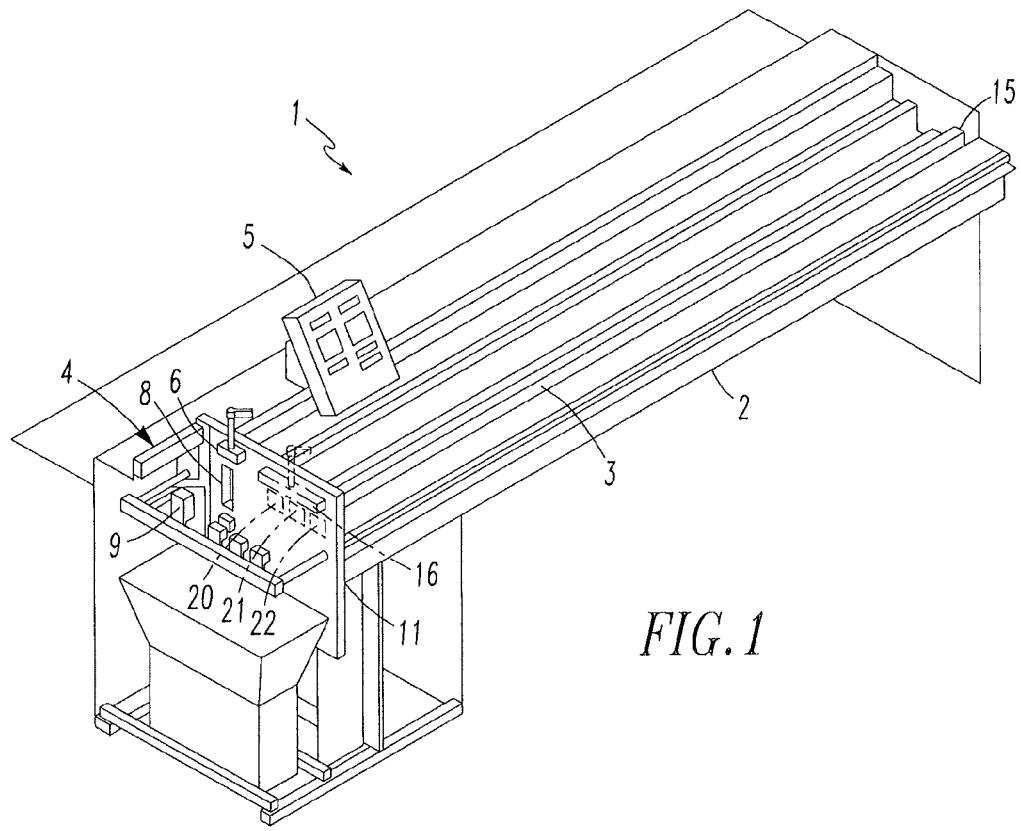
FIG. 1 is a perspective view of a first present preferred embodiment of my window covering cutting device.

Referring to FIG. 1, a first embodiment 1 of my window covering cutting device has a support table 2 that has a support surface 3. The support surface extends from the first edge 11 of the table to the second edge 15 of the table. The first edge 11 is normal to the support surface 3. The support surface 3 is sized and configured to support at least a portion of a window covering that is to be cut by the cutting mechanism 4 of the cutting device. The cutting mechanism 4 is adjacent the first edge 11 of the table and has a housing 7 that is connected to the table 2. The housing 7 has an opening 8 that is sized and configured to receive a portion of a window covering. A moveable end stop 9 is also connected to the housing 7. The moveable end stop can be extended away from or retracted closer to the housing.

Figure 2:
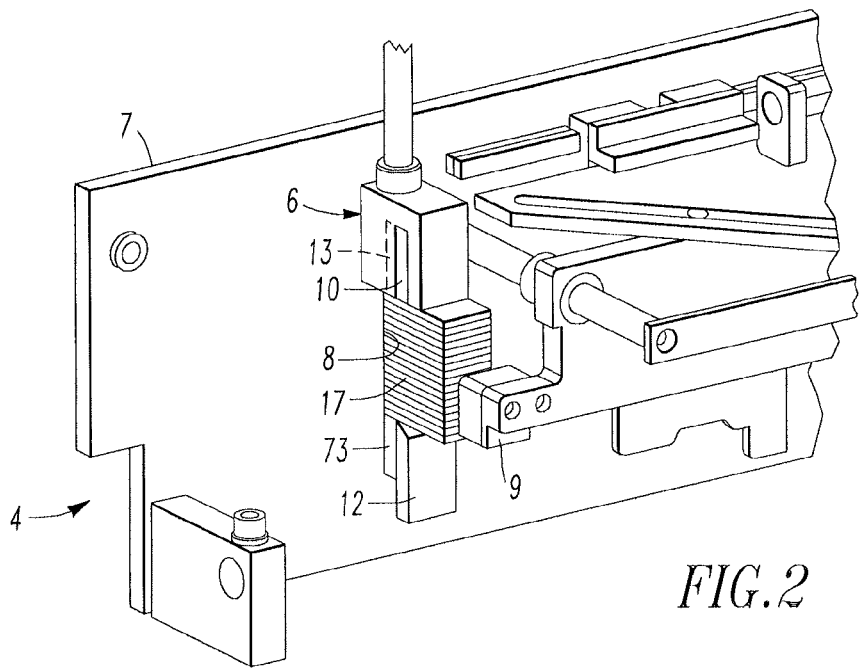
FIG. 2 is a fragmentary view of a first present preferred embodiment of a cutting mechanism that can be used in my window covering cutting device, illustrating the blade in its first position and the clamp in a clamping position.
Figure 3:
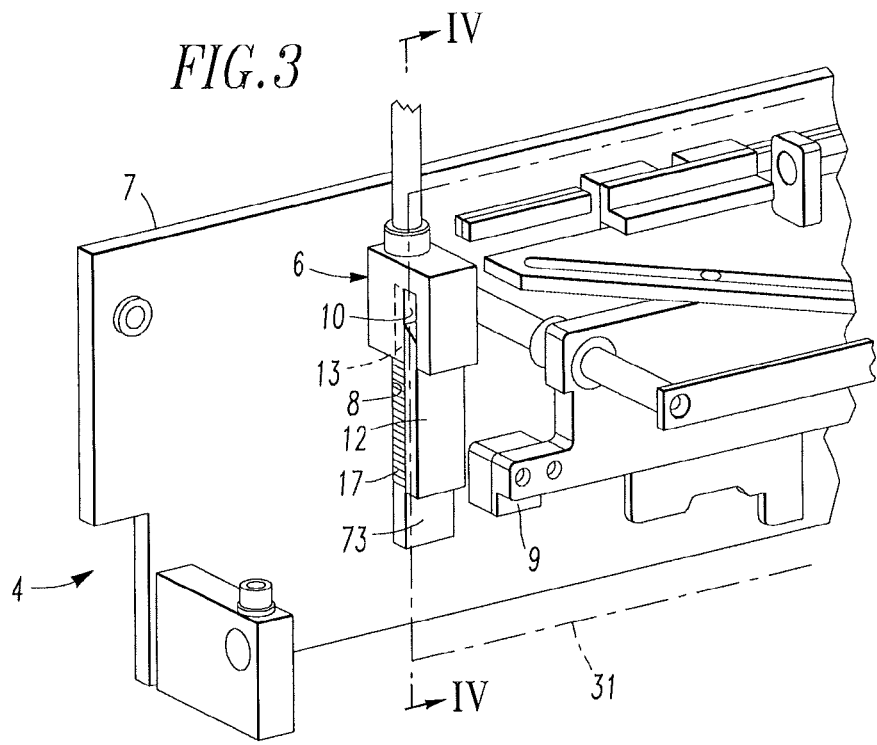
FIG. 3 is a fragmentary view similar to FIG. 2 showing the blade in its second position and the clamp in a clamping position.

A clamp 6 is also connected to the housing. The clamp 6 is positioned over the opening 8 and can be moved from an open position to one of various clamping positions. The clamp 6 has a slot 10, as may best be seen in FIGS. 2 and 3. The clamp is positioned near the support surface 3 such that there is a plane 31 passing through the slot 10, as illustrated in dotted line in FIG. 3. The plane 31 is adjacent the first edge 11 of the support table. The clamp can be moved from an open position, to a clamping position. When the clamp 6 is moved to a clamping position, as shown in FIGS. 2 and 3, the clamp should engage a portion of a window covering 17 that is to be cut by the cutting mechanism. Typically, the portion of the window covering will be window covering material such as slats from a Venetian blind or vanes from a vertical blind or a portion of a cellular shade.

The clamp has a slot 10 which separates two clamping surfaces 6a and 6b. When the clamp 6 is moved to a clamping position, the window covering will be held on each side of the housing by surfaces 6a and 6b. Surface 6a engages a portion of the window covering 17 adjacent the support surface 3 and housing 7. Surface 6b engages a portion of the window covering 17 that extends through opening 8. Surface 6a is attached to surface 6b by bolts that extend through slot 78 in the housing 7 so that surfaces 6a moves when surface 6b moves. Slot 78 is preferably sized to define the extent to which clamp 6 may move from an open position, wherein the clamp 6 does not engage any portion of a window covering, to a clamped position.

Figure 4:
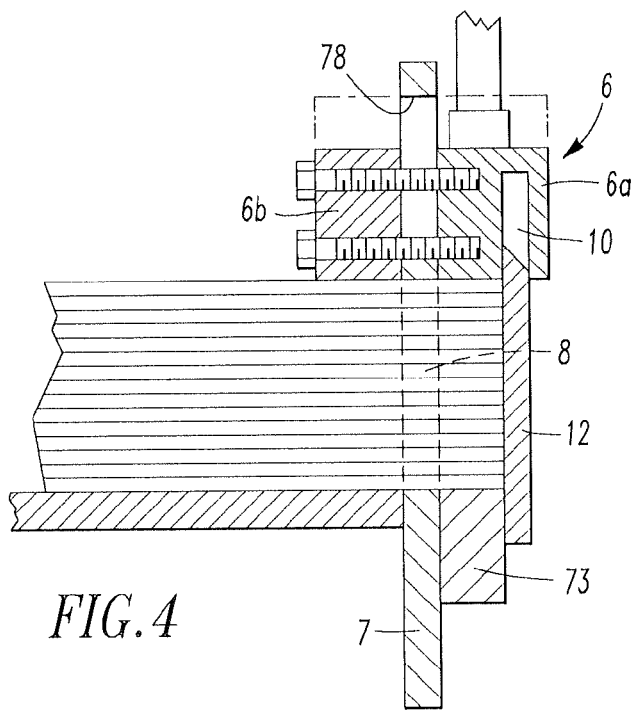
FIG. 4 is a sectional view taken along the line IV-IV in FIG. 3.

It should be understood that surfaces 6a and 6b may be separate parts that define each surface, as best seen in FIG. 4, or be part of a unitary clamp body. Surfaces 6a and 6b may be configured to move in unison or move separately so that the one surface can be adjusted independently of the other surface.

A blade 12 is also connected to the cutting mechanism 4 adjacent a spacer 73 located below opening 8. The spacer 73 is preferably sized and configured to support a portion of the window covering 17 that extends through the opening 8. The blade is positioned such that the blade moves within the plane 31 along a vertical axis from a first position below opening 8, as shown in FIG. 2, to a final position shown in FIGS. 3 and 4 while passing through the position shown in FIG. 2. The blade 12 cuts the window covering material and enters the slot 10 after the cut has been made. When in the final position, a portion of the blade is located within slot 10 of the clamp 6, as shown most clearly in FIG. 4. During the cut, surfaces 6a and 6b provide support on either side of the cut.

It should be appreciated that if the window covering product has a vinyl headrail and vinyl bottomrail, the headrail and bottomrail may be cut by the same blade that cuts the window covering material. For the cut down of such a window covering, the window covering material, headrail, and bottomrail could be extended through opening 8 and cut at the same time or in the same cutting pass.

Figure 4A:
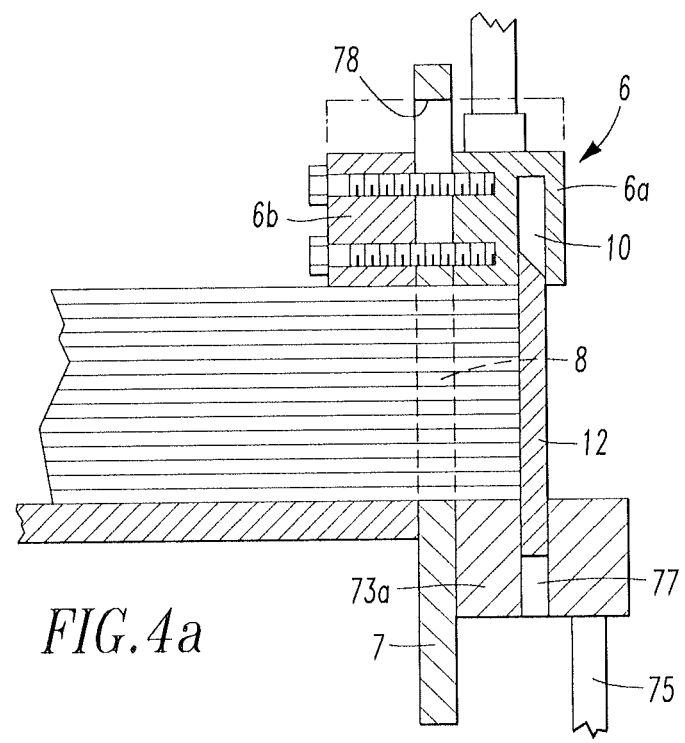
FIG. 4a is a section view similar to FIG. 4 showing a second clamp having a slot through which the blade passes.
Figure 4B:
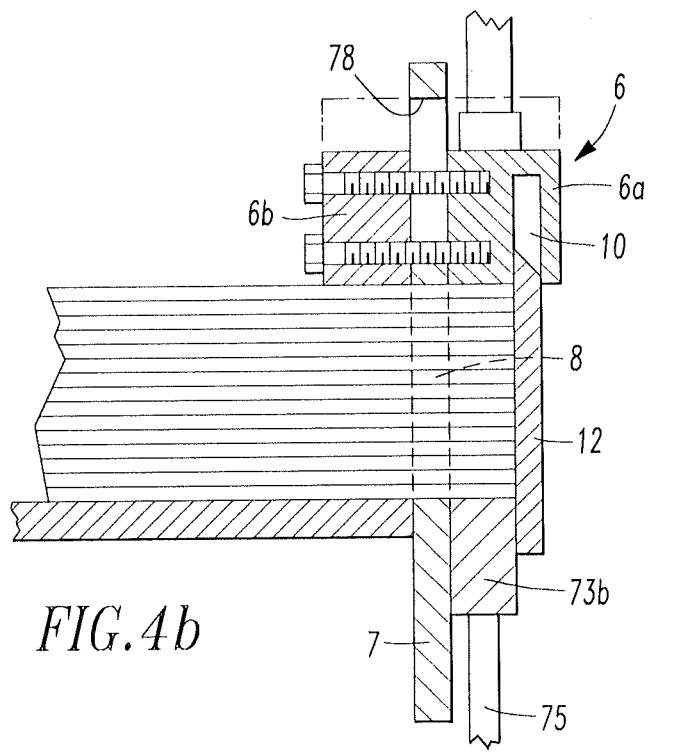
FIG. 4b a sectional view similar to FIG. 4 showing a second clamp.

In alternative embodiments, spacer 73 may be replaced with a second clamp 73a, shown in FIG. 4a, or a second clamp 73b shown in FIG. 4b that has a clamping surface that is comparable in size to surface 6a on the clamp 6. Piston rods 75 may be provided to raise and lower the second clamp. Prior to the cut, the second clamp is positioned to engage the window covering material from below the opening 8. When the blade 12 is actuated, it moves adjacent the second clamp and through plane 31 into slot 10 of clamp 6 to make the cut. Of course, the second clamp can be configured with a slot 77 that is aligned with slot 10 and is sized to permit the blade to pass through the slot of the second clamp, travel through plane 31, and into slot 10 of clamp 6 when making a cutting pass. It should be appreciated that such embodiments permit the second clamp to support the portion of the window covering being cut on both sides of the cut.

In other embodiments, the blade 12 or clamp 6 may be sized and configured so that the entire blade is located within slot 10 of the clamp prior to actuation of the blade 12. When the blade is actuated, the blade 12 is first moved below opening 8 to its initial position and then, after a portion of a window covering is extended through the opening 8 and clamped, the blade is moved vertically along plane 31 to cut the portion of the window covering.

A controller 5 is connected to the support table 2 and is operatively connected to the blade 12. A user can manipulate the controller to actuate the blade 12. In some embodiments, the controller can also be operatively connected to the clamp or clamps to cause the clamps to move from an open position to a clamping position.

The housing 7 may have additional openings 20, 21, 22 sized to receive different parts of a window covering, as illustrated by dotted line in FIG. 1. Opening 20 can be sized and configured to receive a headrail, opening 21 can be sized and configured to receive window covering material and opening 22 can be sized and configured to receive a bottomrail. Additional clamps and blades may also be provided similarly to clamp 6 and blade 12. For example, a second clamp 16 can be connected to the housing above openings 20, 21 and 22 and adjacent to clamp 6, as illustrated by dotted line in FIG. 1. Clamp 16 can be placed in a clamping position to clamp a portion of window covering material extending from opening 21 or a portion of a window covering that extends though openings 20, 21, 22. Similarly, a second blade (not shown) may be provided that cuts any portion of window covering that extends beyond openings 20, 21 or 22.

The blade 12 can deflect into the housing 7 or other parts of the cutting mechanism 4 when the blade is moved to cut a portion of a window covering. Such deflections can damage the blade or cause the blade to experience greater wear, which reduces the useable life of the blade. An insert 13, which is shown in dotted line in FIGS. 2 and 3, can be positioned adjacent the slot 10 so that the blade may deflect into the insert after it cuts down a window covering. The insert is preferably made of a plastic or rubber to minimize the amount of wear the deflection of the blade may cause. Of course, more than one insert may be positioned within the slot 10 to cover multiple sides of the slot 10 in the clamp or all the sides of the slot 10. The clamp may also be composed of plastic or rubber to minimize the wear on the blade that may occur when the blade deflects against the clamp.

I have found that a blade 12 provides the best cut when the slot 10 is narrow. As a result, I prefer to use a slot that is only slightly wider than the width of the blade. Alternatively, one or more inserts can be positioned within the slot to make the width of the portion of the slot that receives the blade substantially the same width as the blade.

Figure 5:
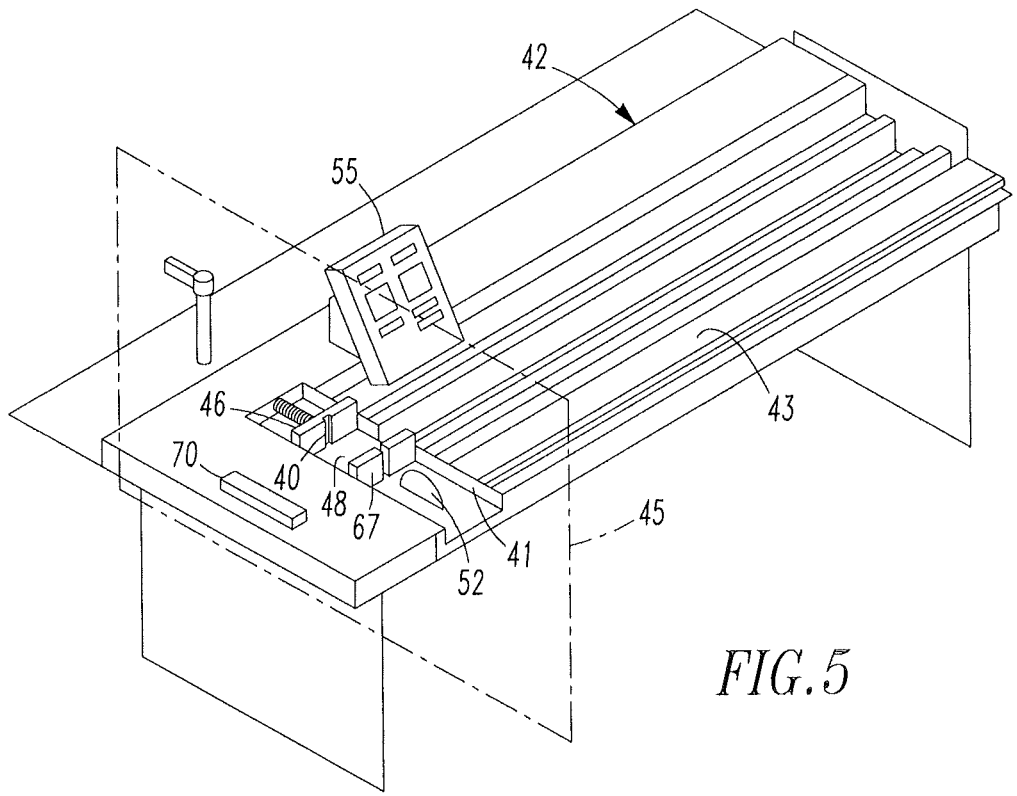
FIG. 5 is a perspective view of a second present preferred embodiment of my window covering cutting device with the blade in its first position and the clamp in a clamping position.
Figure 6:
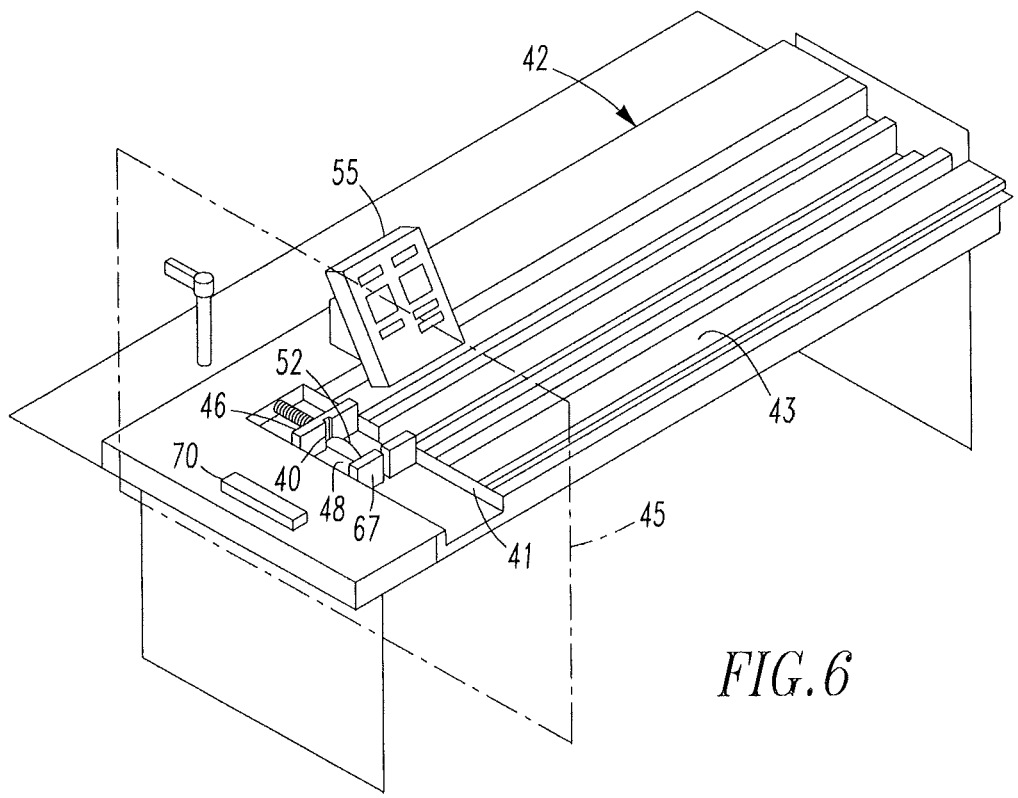
FIG. 6 is a perspective view of the second present preferred embodiment of my window covering cutting device with the blade in its second position and the clamp in a clamping position.

Referring to FIGS. 5 and 6, a second embodiment of my cutting device has a clamp 46 with a slot 40. The clamp 46 is positioned within an aperture 48 in the support table 42. The support table also has a support surface 43 that is sized and configured to support a window covering work piece or at least one portion of a window covering. Edge 41 of the table defines a portion of the aperture 48 in the table and is normal to the support surface 43. The clamp 46 is positioned within the aperture 48 so that a horizontally aligned plane 45 passes through the slot 40 of the clamp. The plane 45 shown in dotted line in FIG. 5 is adjacent edge 41. A split stop 67 is connected to the table 42 and is positioned adjacent the plane 45 and near the support surface 43. The clamp is moveable toward and away from the split stop so that the clamp can be moved from an open position to various clamping positions. The split stop 67 can be moveable along the aperture 48 or affixed in one location on the table 42. If the stop 67 is moveably connected to the table 42, a locking mechanism is preferably provided to lock the stop into a position along the aperture 48.

A blade 52 is connected to the table so that the blade 52 moves within the plane 45 along a horizontal axis from a first position, located away from the slot 40, to a second position, located within the slot 40. Controller 55 is operatively connected to the blade 52 and can be manipulated by a user to actuate the blade 52.

Figure 7:
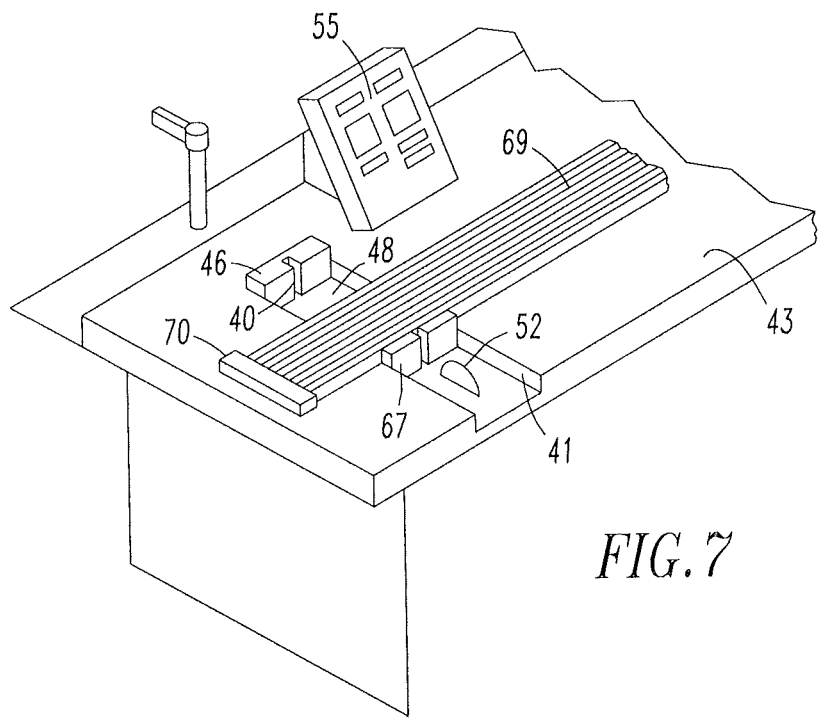
FIG. 7 is a fragmentary view of the second present preferred embodiment showing a window covering work piece positioned between the clamp and the end stop. The clamp is illustrated in its open position and the blade is illustrated in its first position.
Figure 8:
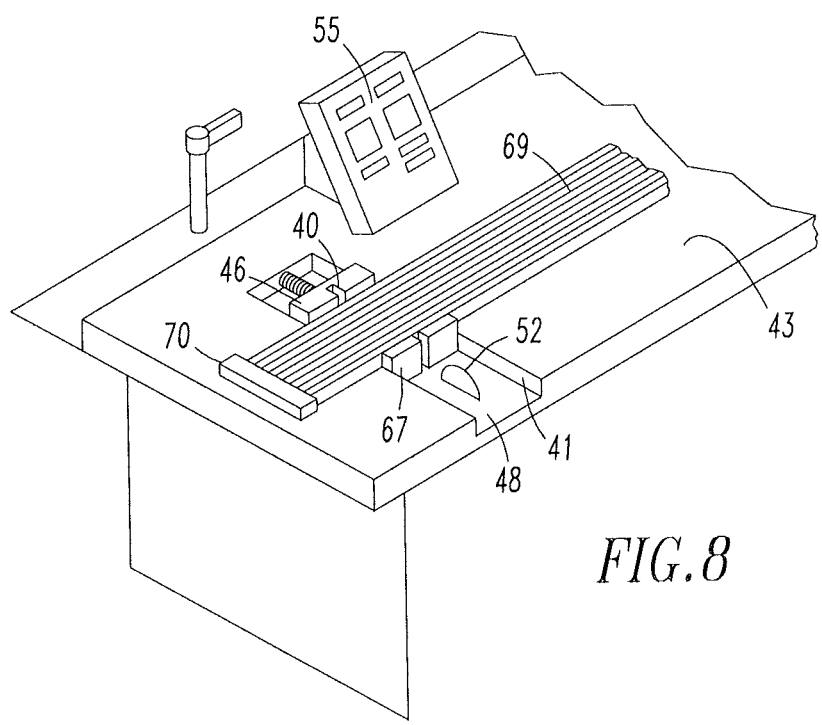
FIG. 8 is a view similar to FIG. 7 showing one side of the work piece being engaged by the end stop and the opposite side being engaged by the clamp, which is in a clamping position.

Referring to FIG. 7, a window covering work piece 69 can be inserted between the clamp 46 and split stop 67 to cut a portion of the work piece 69. The workpiece is positioned to abut end stop 70 which has been moved to the correct position for removing the desired amount of work piece 69. The clamp 46 may be moved from its open position to a clamping position such that the clamp engages one side of the work piece and the split stop engages an opposite side of the work piece, as shown in FIG. 7. The blade 52 is then actuated to cut the work piece 69 and enter slot 40. It should be appreciated that at least a part of the blade 52 enters the slot 40 to ensure the entire portion of the work piece 69 is cut by one cutting pass of the blade 52.

While I have shown and described certain present preferred embodiments of my window covering cutting device and have illustrated certain present preferred methods of making and using the same, it is to be distinctly understood that the invention is not limited thereto but may be otherwise variously embodied and practiced within the scope of the following claims.

I claim:

1. A window covering cutting device comprising:
a support table having a support surface on which at least a portion of a window covering to be cut is placed, the support table having a peripheral edge that is normal to the support surface;
a clamp having a slot, the clamp positioned near the support surface so that there is a plane passing through the slot, the plane being adjacent the peripheral edge of the support table, the clamp moveable along the plane from a first open position to at least one clamping position; and
a blade positioned for movement within the plane from a first position to a second position so that a portion of the blade will be within the slot of the clamp when the blade is in the second position and the clamp is in the at least one clamping position; and
wherein the clamp and the blade move in opposite directions along a common axis when the clamp moves from the first open position to the at least one clamping position and the blade moves from the first position to the second position.

2. The window covering cutting device of claim 1 further comprising a housing connected to the support table, the housing having a first opening sized to receive a portion of the window covering to be cut.

3. The window covering cutting device of claim 2 wherein the first opening is sized and configured to receive a cellular shade or slats from at least one of vertical blinds and venetian blinds.

4. The window covering cutting device of claim 2 wherein the housing is further comprised of a second opening sized and configured to receive a headrail of a window covering, the second opening being adjacent the first opening.

5. The window covering cutting device of claim 4 wherein the housing is further comprised of a third opening sized and configured to receive a bottomrail of a window covering, the third opening being adjacent the first opening.

6. The window covering cutting device of claim 1 further comprising at least one resilient insert positioned adjacent the slot of the clamp.

7. The window covering cutting device of claim 6, wherein the at least one resilient insert is comprised of a plastic or rubber.

8. The window covering cutting device of claim 1 further comprising a moveable end stop positioned opposite the support surface.

9. The window covering cutting device of claim 1 wherein the clamp is comprised of a material selected from the group consisting of plastics and rubber.

10. The window covering cutting device of claim 1 wherein the blade moves along a vertical axis.

11. The window covering cutting device of claim 1 wherein the blade moves along a horizontal axis.

12. The window covering cutting device of claim 1 wherein the support table is further comprised of an aperture and the edge of the support table defines at least part of the aperture.

13. The window covering cutting device of claim 1 wherein the clamp is comprised of two separately movable adjacent parts.

14. The window covering cutting device of claim 1 wherein the clamp is a first clamp and the window covering cutting device also comprises a second clamp positioned adjacent the plane and opposite the first clamp.

15. The window covering cutting device of claim 14 wherein the second clamp is movable toward and away from the first clamp.

16. The window covering cutting device of claim 14 wherein the second clamp has a slot that is aligned with the slot of the first clamp.

17. The window covering cutting device of claim 1 wherein the blade is sized and positioned such that the blade will enter the slot after the window covering to be cut has been cut.

18. A window covering cutting device comprising:
- a support table having a support surface on which at least a portion of a window covering to be cut is placed, the support table having a peripheral edge that is normal to the support surface;
- a clamp having a slot, the clamp positioned near the support surface so that there is a plane passing through the slot, the plane being adjacent the peripheral edge of the support table, the clamp moveable along the plane from a first open position to at least one clamping position; and
- a blade positioned for movement within the plane from a first position to a second position so that a portion of the blade will be within the slot of the clamp when the blade is in the second position and the clamp is in the at least one clamping position.

* * * * *